United States Patent [19]

Schmidt

[11] 4,063,748
[45] Dec. 20, 1977

[54] HITCH FOR GANGING LAWN MOWERS

[76] Inventor: Richard H. Schmidt, R.R. 2, Box 63, Davenport, Iowa 52802

[21] Appl. No.: 725,397

[22] Filed: Sept. 22, 1976

[51] Int. Cl.² ............................................. B60D 1/14
[52] U.S. Cl. ..................................... 280/411 C; 56/6; 280/472; 280/492
[58] Field of Search .......... 280/411 R, 411 A, 411 B, 280/411 C, 412, 413, 472, 473, 492; 56/6, 7

[56]  References Cited
U.S. PATENT DOCUMENTS

| | | | |
|---|---|---|---|
| 2,959,234 | 11/1960 | Mason | 280/492 X |
| 3,135,079 | 6/1964 | Dunn | 56/6 |
| 3,514,126 | 5/1970 | Fuss | 280/411 A |

Primary Examiner—Joseph F. Peters, Jr.
Assistant Examiner—John A. Pekar
Attorney, Agent, or Firm—Glenn H. Antrim

[57] ABSTRACT

A rigid side extension draft bar locates to one side of a propelled implement the hitch for a tongue of a pulled implement. Preferably, the pulled implement has caster wheels. Pivots located at the ends of the tongue permit the pulled implement and the propelled implement to travel over different contours at different levels but maintain the fore-to-aft axes of the implements in the same direction so that they turn and back as a unit and maintain the amount of overlap of their paths uniform.

4 Claims, 5 Drawing Figures

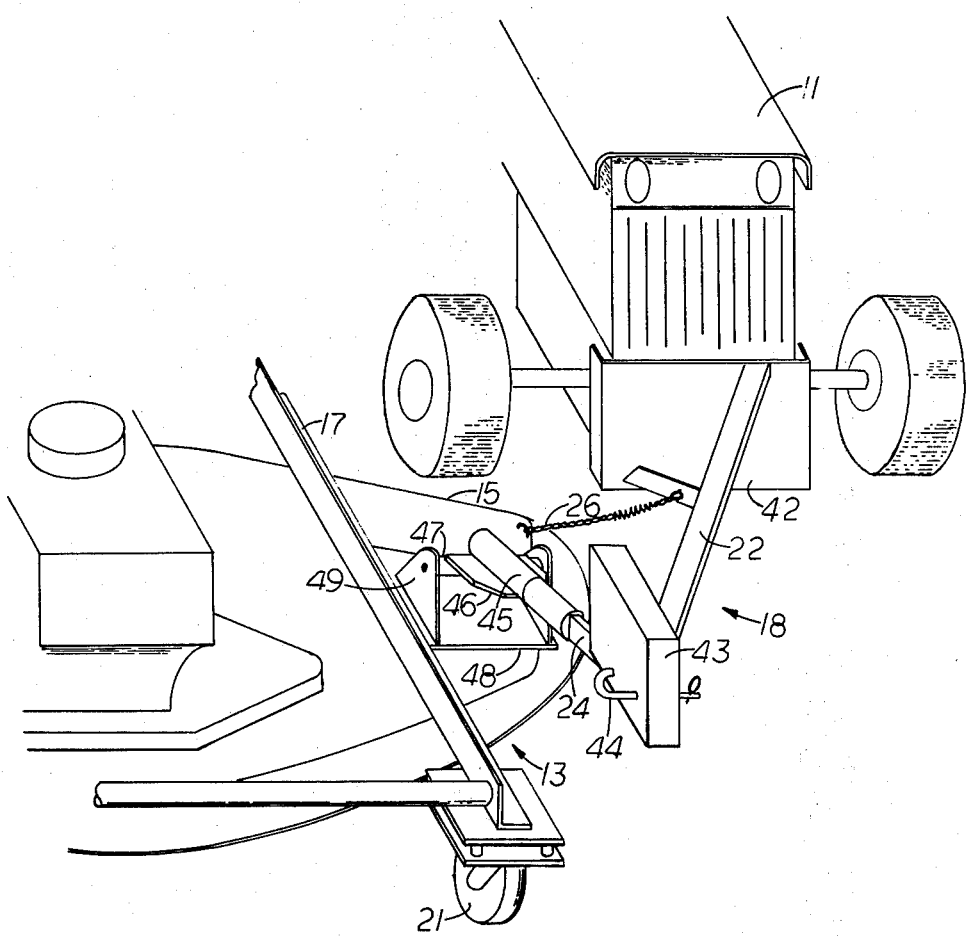
FIG. 3
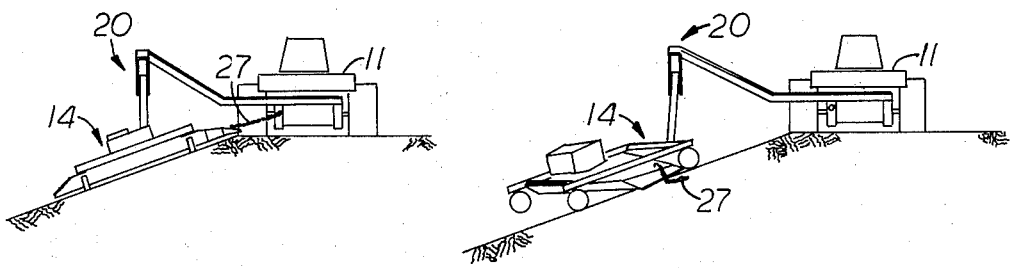
FIG. 4
FIG. 5

4,063,748

HITCH FOR GANGING LAWN MOWERS

BACKGROUND OF THE INVENTION

This invention relates to hitches for ganging lawn mowers and particularly to hitches connecting additional lawn mowers to tractors with mower attachments, the hitches permitting the ganged mowers to follow different slopes, but maintaining the axes of the ganged mowers always in the same direction.

Before rotary mowers were used extensively, reel type mowers were ganged and pulled by tractors. The hitches that were used to connect the mowers to the tractors comprised cross bars having connecting devices for connecting the mowers at intervals along the bars. Hitches such as shown in U.S. Pat. No. 2,830,421 issued to W. J. Blue et al on Apr. 15, 1958, had pivotal sections to permit the reel type mowers to follow various contours. However, a hitch of that construction is not as satisfactory for rotary type mowers as it is for reel type mowers for each rotary mower must rotate about its lateral axis to a much greater extent to follow substantial changes in contour of ground along its path of travel. Neither does that type of hitch nor a hitch for ganging rotary mowers as shown in U.S. Pat. No. 3,514,126 issued to W. H. Fuss on May 26, 1970 maintain the fore-to-aft axes of the pulled mowers and the tractors in the same direction, and as a result, the overlap of the swaths of the mowers is not uniform, but varies greatly while the mowers are being turned or pulled over terrain with different slopes.

SUMMARY OF THE INVENTION

The hitch of this invention comprises a lateral extension draft bar to be connected rigidly to a tractor, and a tongue connected pivotally between the outer end of the rigid bar and a pulled rotary mower assembly. Three pivots associated with the tongue permit the pulled mower assembly to follow along a bank that is either above or below the path of the tractor. Although the pulled mower assembly can rotate about axes perpendicular to its tongue for following any contours of the path along which it is pulled, normally all three pivots restrain rotation about a vertical axis and therefore the fore-to-aft axes of the pulled mower and the tractor are always oriented in the same direction. With the fore-to-aft axes in the same direction, the width of the overlap of the swath of a mower assembly below the frame of the tractor and the swath of the pulled mower assembly can be maintained constant regardless of the contour of the terrain or changes in direction of travel. When the pulled mower assembly and the tractor are on much different slopes, the direction of the axes of the pivots at the rear end of the tongue are changed to such an extent that the pivots alone no longer maintain the axes of the pulled mower and the tractor oriented the same. Therefore, a chain is connected diagonally between the tractor and the pulled mower assembly to prevent the pulled mower assembly from turning with respect to the tractor.

BRIEF DESCRIPTION OF THE DRAWING

FIG. 3 is a perspective view of the hitch assembly connecting the other lawn-mower assembly to the front of the riding lawn mower; and FIGS. 4 and 5 are simplified rear views to show orientation of the pulled lawn-mower assembly when a chain used as a guy is connected and disconnected respectively.

DESCRIPTION OF THE PREFERRED EMBODIMENT

Figure 1:
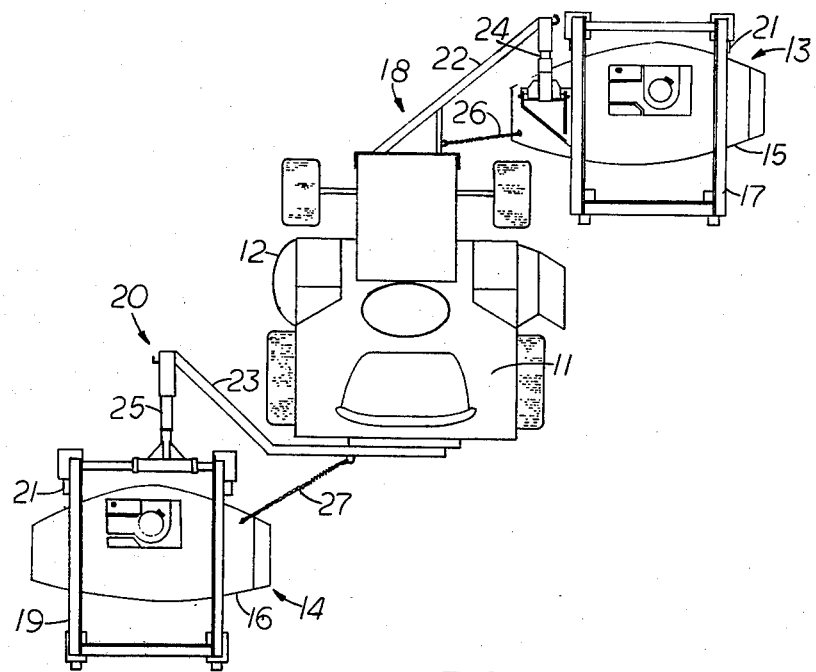
FIG. 1 is a top view of two lawn-mower assemblies connected by hitch assemblies of this invention to the front end and to the rear end respectively of a riding lawn mower.

The ganged lawn-mower equipment of FIG. 1 includes a tractor 11 having a lawn-mower attachment or deck assembly 12 connected below its frame, a lawn-mower assembly 13 connected to the front at the right of the tractor, and a lawn-mower assembly 14 connected to the rear at the left of the tractor 11. The lawn-mower attachment 12 connected to the tractor 11 has a chute at its right side for throwing grass clippings to the right, and likewise the front and rear lawn-mower assemblies 13 and 14 have deck assemblies 15 and 16 respectively with chutes to the right. If the chutes were on the left sides of the respective mower deck assemblies, each of the lawn-mower assemblies 13 and 14 would be positioned along an opposite side of the tractor 11 to spread the clippings evenly.

The front lawn-mower assembly 13 has a mower mounting frame assembly 17 for supporting the mower deck assembly 15 and is connected to the front of the tractor 11 by a hitch assembly 18. Similarly, the rear lawn-mower assembly 14 has a mower mounting frame assembly 19 for supporting its mower deck assembly 16 and is connected to the rear of the tractor 11 by a hitch assembly 20. Each of the mounting frame assemblies 17 and 19 have a plurality of caster-type ground wheels 21 for permitting the respective frame assemblies 17 and 19 to turn readily as a unit with the tractor 11.

The front hitch assembly 18 and the rear hitch assembly 20 have forwardly extending members 22 and 23 respectively of side extension draft bars that are connected rigidly to the tractor 11, and have mower tongues 24 and 25 respectively connected between the outer ends of the forwardly extending members 22 and 23 and the lawn-mower assemblies 13 and 14 respectively. Pivotal connections at the front ends and at the rear ends of the tongues 24 and 25 permit the lawn-mower assemblies 13 and 14 to follow different contours and to mow on different levels. However, the pivots do not ordinarily permit the mower mounting frame assemblies 17 and 19 to turn any noticeable amount about their vertical axes with respect to the fore-to-aft direction of the tractor. When the lawn-mower assemblies 13 and 14 are traveling over slopes that are different from the slope over which the tractor 11 is traveling, the axes of the pivots of the respective tongues 24 and 25 are changed in direction to such an extent that the respective fore-to-aft axes are no longer fully restrained to be only in the direction of the corresponding axis of the tractor 11. In order to maintain parallel alignment of the axes, chains 26 and 27 or other flexible links serving as guys are connected diagonally between the tractor 11 and the lawn-mower assemblies 13 and 14 respectively. By restraining the lawn-mower assemblies 13 and 14 from turning about their vertical axes, the overlaps of the swaths of the mower deck assemblies 12, 15, and 16 are maintained uniform regardless of the slope of ground or of the amount of turning of the tractor 11. When the overlaps are uniform, the overlaps can be held to minimum widths so that the full swath produced by the three deck assemblies during a single pass is maximum.

Although the present hitch assembly may be used to the greatest extent in pulling lawn-mower assemblies as described herein, the hitches can be used with other lawn-care implemental assemblies to mulch, fertilize, or otherwise to treat lawns or other cultivated areas. The hitch assemblies 18 and 20 are suitable for connection to any tractive vehicle such as a riding lawn mower or to any implement ahead of the implement being pulled by a tongue corresponding to the tongue 25 of the hitch assembly 20. Implements ganged through assemblies similar to hitch assemblies 18 and 20 can be operated over varying contours and maintain overlap constant.

Figure 2:
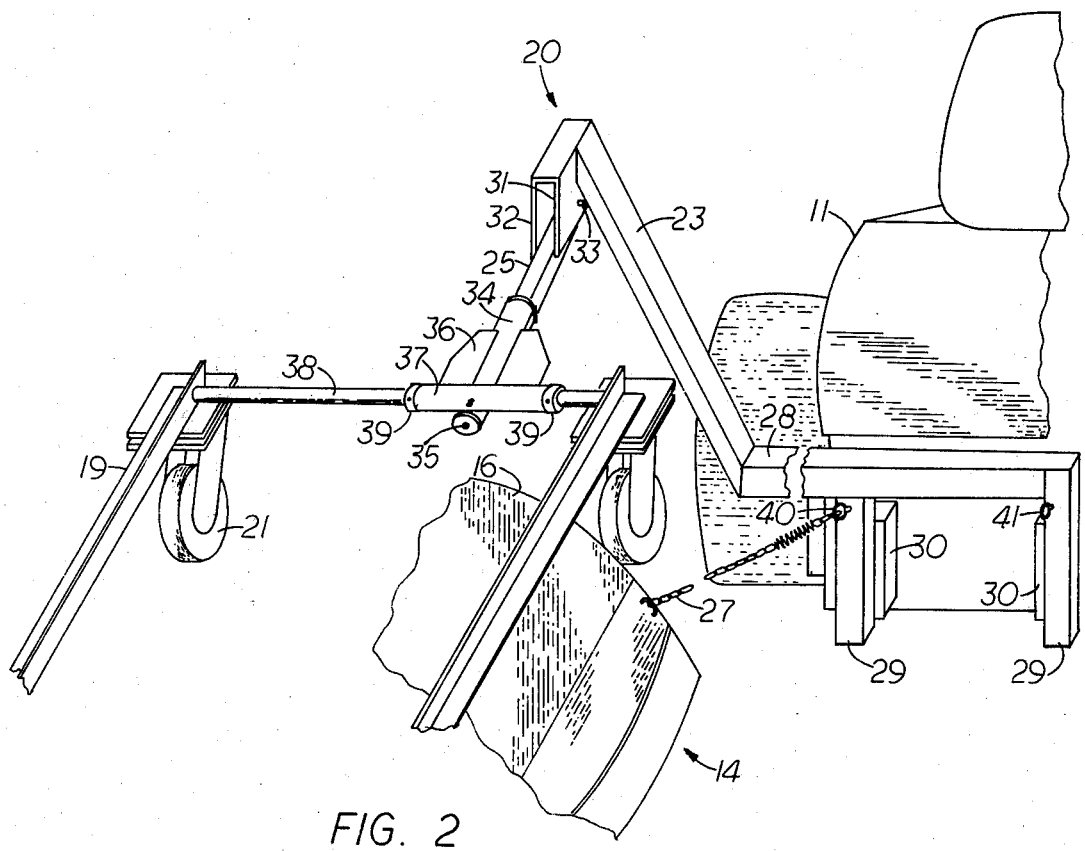
FIG. 2 is a perspective view of the hitch assembly connecting one of the lawn-mower assemblies to the rear of the riding lawn mower.

As shown in FIG. 2, a lawn-mower assembly 14 or other implement that is to be pulled to the rear and to one side of another implement or tractive vehicle 11 is pulled by a side extension draft bar comprising a transverse bar 28 at the back of the vehicle and the diagonally, forwardly extending member 23 extending from the outer end of the transverse bar 28. The transverse bar 28 is connected rigidly to the pulling vehicle or tractor 11 by one or more coupling members 29 connected to the inner end of the bar 28. The coupling members 29 are adapted to fit the hitch coupling members 30 of the tractive vehicle and must hold the bar 28 rigidly to function as an extension of the frame of the vehicle.

One of three pivots associated with the tongue 25 has a pair of parallel plates 31 and 32 connected to the outer end of the forwardly extending member 23 of the side extension draft bar. The plates 31 and 32 form a deep, narrow clevis having sides parallel to the fore-to-aft axis of the tractor 11 and vertical to the supporting surface for the tractor. The forward end of the tongue 25 is slightly more narrow than the space between the plates 31 and 32, and when the end of the tongue is positioned between the plates 31 and 32, it is held by a pivot pin 33 that extends through the plates 31 and 32 and the end of the tongue 25. Although the tongue 25 can rotate over a substantial arc about the pivot pin 33, it is restrained from any other motion relative to the tractor 11. The tongue 25 is long enough and can rotate sufficiently about the pivot pin 33 to permit the lawn-mower assembly 14 to be pulled at either a higher or lower level along a bank beside the path of the tractor.

The rear end of the tongue 25 is rounded and fits rotatively into a sleeve 34 to form one of two pivots connecting the rear end of the tongue 25 to the front end of the lawn-mower assembly 14. The end of the tongue 25 is retained in the sleeve 34 by a washer 35 that is secured to the extreme rear end of the tongue. This pivot permits the mower mounting frame assembly 19 to turn about a fore-to-aft axis for following irregularities of the ground. The other pivot at the front of the mower has a sleeve 37 welded perpendicularly to the sleeve 34. A plate 36 welded between the sleeves 34 and 37 functions as a gusset to strengthen the interconnection. The sleeve 37 is a rotatable fit about a rod 38, the rod being a cross member at the front of the mower mounting frame assembly 19. The pivot provided by the sleeve 37 and the rod 38 permits the lawn-mower assembly 14 to move up and down over irregularities of the ground. The amount of overlap of the swaths of the lawn-mower attachment 12, connected beneath the tractor 11, and the mower deck assembly 16, carried by the mower mounting frame assembly 19, can be varied by changing the position of the sleeve 37 along the cross member 38. A collar 39 around the cross member 38 at each end of the sleeve 37 is loosened to facilitate positioning of the sleeve along the cross member. A chain 27 is connected diagonally from the forward right portion of the mower deck assembly 16 to the rear end of the tractor 11. For a particular installation as shown in FIG. 2, eye bolts 40 and 41 have been connected to respective spaced coupling members 29, and a hook at the end of the chain 27 facilitates making connection to either of the eye bolts.

The front hitch assembly 18 of FIG. 3 differs from the rear hitch assembly 20 in that it is adapted for mounting to the front of the tractor and to the side of the mower attachment 12. The forwardly extending side extension draft bar 22 is rigidly fastened to a plate 42 connected to the front of the tractor 11. The pivot assembly 43 at the forward, outer end of the forwardly extending member 22 has a pair of parallel plates corresponding to plates 31 and 32 as described above and likewise receives the front end of a tongue 24 that is pivotally connected to the pivot assembly 43 by a pivot pin 44. The rear end of the tongue 24 is rounded and it is rotatable within a sleeve 45 corresponding to the sleeve 34 described above. The sleeve 45 is fastened to a perpendicular sleeve 47 by being welded to an intermediate gusset plate 46. The sleeves 45 and 47 that are joined in a cross configuration are connected through a bracket 48 to the mounting frame assembly 17. The bracket 48 is secured to the mounting frame assembly 17 near the side adjacent the tractor 11. The bracket 48 has two upstanding ends 49 spaced apart to hold a transverse bar therebetween for receiving rotatably the sleeve 47. Although the sleeve 47 as shown in FIG. 3 is not adjustable, the bracket 49 can be widened to provide the lateral adjustment shown in FIG. 2. The two pivots having the sleeves 45 and 47 respectively provide the tilting and the up-and-down motions of the lawn-mower assembly 13 as described above for the mower assembly 14 mounted at the rear of the tractor. The chain 26 extends diagonally from the mower deck assembly 15 to an eye bolt on the mounting of the side extension draft bar 22.

With reference to FIG. 4, when the tractor 11 is on level ground and the rear lawn-mower assembly 14 is on a downwardly sloping bank, the chain 27 maintains the axes of the lawn-mower assembly 14 and the tractor 11 parallel. If the chain 27 is disconnected as shown in FIG. 5, the lawn-mower assembly 14 turns such that its rear end is lower or downhill with respect to its front end. Referring again to FIG. 2, when the lawn-mower assembly 14 is on a bank, the sleeve 37 and the rod 38 are no longer level and therefore are no longer fully effective to prevent rotation about a vertical axis. When the chain 27 is connected, it functions as a guy to maintain the fore-to-aft axes in a similar direction and to maintain the overlap of the implements nearly constant.

As shown in FIG. 2, a side extension draft bar preferably has a forwardly extending portion 23. However, the transverse bar 28 can be extended and the plates 31 and 32 for the pivot at the front end of the tongue 25 can be fastened directly to the end of the straight bar 28. Furthermore, if the transverse bar corresponding to the bar 28 is long enough, the sleeve 37 at the rear end of the tongue can be positioned about in the middle of the cross bar 38. However, for compactness and best maneuverability, the use of the forwardly extending bar 23 and the connection toward one end of the bar 38 is preferred.

The mounting frame assemblies 17 and 19, each generally supported on four caster wheels, are generally important parts of the hitch assemblies. Desired implements can be connected to the frames in a conventional manner, and motors of suitable power connected to the implements. The use of pulled mower assemblies with relatively low height is advantageous in mowing near and under trees. While the operator on the tractor moves around the ends of the lower limbs of the trees, one of the mower assemblies at the side of the tractor extends readily beneath the limbs for mowing those rather inaccessible areas. In turning or backing on fairly level ground, the ganged implements turn as a unit so that they are easily maneuverable, and while traveling forward in a usual manner can mow or otherwise care for ground cover without missing strips and without excessive overlap.

I claim:

1. A hitch assembly for ganging a plurality of lawn-care implemental assemblies, a tractive vehicle having a fore-to-aft direction and movable along a supporting surface, at least one of said lawn-care implemental assemblies being attached to said tractive vehicle, an implemental mounting frame assembly to which at least another of said lawn-care implemental assemblies is attached, said implemental mounting frame assembly having a plurality of caster wheels and a front end to which said hitch assembly is to be attached, said hitch assembly comprising:

a side extension draft bar having a transverse portion and a forwardly extending portion, coupling means secured to said transverse portion for coupling said side extension draft bar rigidly to said tractive vehicle, said forwardly extending portion positioning one end of said side extension draft bar ahead of said coupling means at one side of said tractive vehicle, an implemental tongue restained to be in a plane perpendicular to the surface supporting said tractive vehicle and parallel to the fore-to-aft direction of said tractive vehicle, said implemental tongue having a forward end to be connected to said tractive vehicle and a rear end to be connected to said implemental mounting frame assembly, first pivotal means connecting the forward end of said implemental tongue to said one end of said side extension draft bar, said first pivotal means permitting said implemental tongue to rotate only about an axis parallel to the surface that supports said tractive vehicle and perpendicular to the fore-to-aft direction of said tractive vehicle, the length of said implemental tongue and the amount of rotation thereof being sufficient to permit said implemental mounting frame assembly to follow a steep bank beside said tractive vehicle, and second pivotal means connected between the rear end of said implemental tongue and the front end of said implemental mounting frame assembly, said second pivotal means permitting said implemental mounting frame assembly to rotate only about the longitudinal axis of said implemental tongue, and about an axis parallel to the surface supporting said implemental mounting frame assembly and perpendicular to the longitudinal axis of said implemental tongue.

2. A hitch assembly as claimed in claim 1 having a flexible link connected diagonally in a rearward and outward direction from said tractive vehicle to the adjacent side of said implemental mounting frame assembly, the connection thereto being spaced with respect to said second pivotal means to prevent said implemental mounting frame assembly from turning outwardly from the path of said tractive vehicle as said tractive vehicle and said implemental mounting frame assembly are traveling over ground having different slopes.

3. A hitch assembly as claimed in claim 1 wherein said first pivotal means comprises a pair of parallel plates secured to said one end of said side extension draft bar and spaced apart a distance slightly greater than the distance across the forward end of said implemental tongue, the forward end of said implemental tongue being positioned between said plates such that said forward end extends a substantial distance between said plates, and a pivot pin positioned transversely through said plates and said forward end.

4. A hitch assembly as claimed in claim 1 wherein said implemental mounting frame assembly has a crossbar secured transversely to the front end thereof, said second pivotal means being connected to said crossbar and being adjustably movable along said bar to determine the amount of overlap of the paths of adjacent ones of said lawn-care implemental assemblies mounted respectively on said tractive vehicle and on said implemental mounting frame assembly.

* * * * *